United States Patent [19]
Tarves, Jr.

[11] 3,800,505
[45] Apr. 2, 1974

[54] METHOD AND APPARATUS FOR REMOVING OIL FROM EFFLUENT GAS

[75] Inventor: Robert J. Tarves, Jr., Blackwood, N.J.

[73] Assignee: Air Pollution Specialties, Inc., Philadelphia, Pa.

[22] Filed: Oct. 11, 1972

[21] Appl. No.: 296,731

[52] U.S. Cl.............................. 55/8, 55/11, 55/93, 55/122, 55/135, 55/222, 55/223, 55/228, 55/229, 55/269, 55/418, 261/7, 261/128, 261/149, 261/151, 261/94, 261/116, 261/DIG. 54

[51] Int. Cl............................................. B03c 3/01

[58] Field of Search................ 55/6, 7, 8, 9, 10, 11, 55/84, 89, 90, 93, 94, 122, 124, 126, 128, 129, 134, 135, 220, 222, 223, 228, 229, 233, 257, 259, 260, 267, 268, 269, 418; 261/DIG. 54, 2, 3, 7, 127, 128, 146, 147, 149, 151, 94, 95, 96, 97, 98, 99, 115, 116, 117, 118

[56] References Cited
UNITED STATES PATENTS

| | | | |
|---|---|---|---|
| 1,871,815 | 8/1932 | Meston et al............................ | 55/8 |
| 2,273,194 | 2/1942 | Hedberg et al.................. | 55/122 X |
| 3,221,475 | 12/1965 | Wiemer................................ | 55/10 |
| 3,435,593 | 4/1969 | Nordone............................... | 55/84 |
| 3,608,275 | 9/1971 | Wiemer et al..................... | 55/129 X |
| 3,740,926 | 6/1973 | Duval................................ | 55/126 X |
| 3,745,751 | 7/1973 | Zey et al........................... | 23/284 X |

OTHER PUBLICATIONS

"Smog-Hog Oil Mist Eliminators and Space-Clean Industrial Air Cleaners," Bulletin M-5A United Air Specialists, Inc., 6665 Creek Road, Cincinnati, Ohio 45242, copyright 1969, 4 pages.

*Primary Examiner*—Dennis E. Talbert, Jr.
*Attorney, Agent, or Firm*—Seidel, Gonda & Goldhammer

[57] ABSTRACT

Oil is removed from hot effluent gas by cooling the gas, scrubbing the gas in two stages, removing entrained droplets in a demister and introducing the gas into an electrostatic precipitator. After the gas leaves the electrostatic precipitator, approximately 99 percent, by volume, of the oil is removed from the gas and the gas is rendered substantially invisible. The gas is thus in a condition to be returned to the atmosphere. The apparatus consumes little energy and is relatively maintenance free in operation. A portion of the water used in a heat exchanger for cooling the gas may be used in the two scrubbing stages and recycled within the system.

10 Claims, 2 Drawing Figures

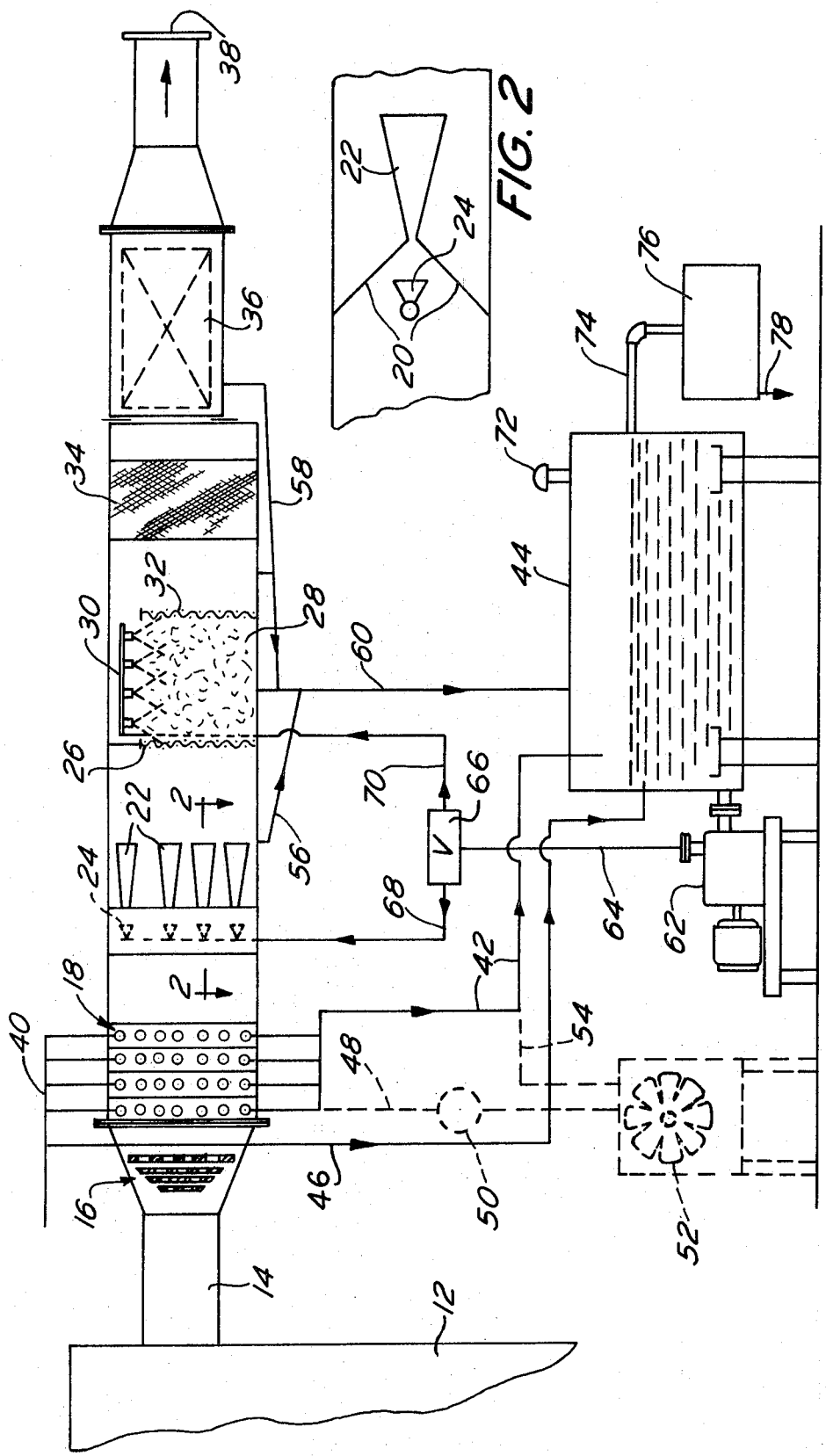

METHOD AND APPARATUS FOR REMOVING OIL FROM EFFLUENT GAS

The present invention relates to a method and apparatus for removing oil from effluent gas and, more particularly, to a method and apparatus for removing oil from effluent gas which requires very little maintenance and little energy input.

There are many processes during which oil is introduced into a gas stream. It has become increasingly important to develop an apparatus and method for removal of oil from effluent gas in view of increasingly rigid and strict pollution control standards. In the textile industry, it is common to add oil to fibers to prevent them from cracking when they are knit. The oil is normally thereafter removed in a dryer. It is important that the oil be removed so that it will not interfere with subsequent bleaching and dying operations.

The oil is normally removed from the textiles in large dryers. The oil is flashed off of the textiles as heated gas comes into contact with the textiles. The oil laden effluent gas which appears as a white plume with a grey or blue tint cannot be introduced directly to the atmosphere without seriously polluting the atmosphere. Accordingly, it has become increasingly important to develop a method and apparatus for removing the oil from the effluent gas.

There are numerous other processes wherein oil becomes a contaminant in a gas stream. Such processes include the production of potato chips, french fries, peanuts, and the like. The aforementioned processes are merely illustrative and many other processes could be cited wherein a gas stream becomes contaminated with oil.

The present invention is directed to a method and apparatus for removing oil from effluent gas which is highly effective in operation. The effluent gas normally exits from a dryer or oven at a temperature of approximately 200° F to 400° F. A conduit is connected to the dryer through which the gas is adapted to flow. The conduit is provided with means to render the effluent gas substantially oil free and substantially invisible.

The entrance end of the conduit includes a series of baffles for evenly dispersing the effluent gas in the conduit. Thereafter, the gas contacts a heat exchanger so that the gas is cooled to approximately 90° F to 125° F. The effluent gas is cooled so that the contaminants therein will be readily condensible. In the preferred embodiment, the gas is traveling through the conduit at a velocity of approximately 450 feet per minute.

The gas is directed through a plurality of vertically aligned venturi cones. As the gas passes through the cones, it is scrubbed by jets of water located immediately adjacent the venturi cones. The speed of the gas as it passes through the venturi cones is greatly increased and substantial turbulence is created. The turbulence aids in the scrubbing action to insure intimate contact of the oil with the water to insure removal of a substantial quantity of the oil from the effluent gas.

The gas is thereafter directed through a screen into a packed ceramic saddle bed. The gas is scrubbed as it passes through the ceramic saddle bed. A suitable ceramic bed is sold by Norton Plastics and Synthetic Division of Akron, Ohio under the trademark "SUPER INTALOX SADDLES." A plurality of spray nozzles are adapted to spray water through the ceramic bed to aid in the removal of oil remaining in the effluent gas. The ceramic bed causes the gas to travel a tortuous path to insure that substantially all the gas comes into contact with the scrubbing water.

The gas exits from the ceramic bed through a screen and enters a demister. The demister removes entrained droplets of liquid from the gas. The liquid removed in the demister is primarily water. The gas is traveling at a velocity of approximately 450 feet per minute through the demister. A suitable demister is sold by Munters Corp. of Fort Myers, Florida under the trademark "PLASDEK."

The gas is then introduced into an electrostatic precipitator of conventional design. A suitable electrostatic precipitator is sold by United Air Specialists, Inc. of Cincinnati, Ohio under the trademark "SMOG-HOG." Substantially all remaining entrained droplets are removed from the gas in the electrostatic precipitator. As the gas exits from the electrostatic precipitator, the gas is substantially oil free and invisible. The gas is thereafter returned to atmosphere. It is believed that approximately 99 percent of the oil, by volume, is recovered by use of the method and apparatus of the present invention. If desired, the outlet of the conduit may be provided with a conventional venturi or air mover such as a blower to facilitate movement of the gas from the conduit outlet into the atmosphere.

The heat exchanger utilizes a supply of fresh water which is at approximately 50° F. The water exiting from the heat exchanger is at approximately 90° F to 125° F. A portion of the heated water may be introduced directly into a water recycling tank, or alternatively, the heat in the water may be recovered by introducing the water into an energy balance device. The energy balance device will use the heat from the water in any desired manner and thereafter pump the water into a storage tank or a portion can be transmitted to the water recycling tank. Water and oil are removed from the conduit at various locations therein and returned to the water recycling tank. The water and oil are introduced at the top of the tank. A fresh supply of water may be introduced into the water recycling tank. The fresh water may be introduced at the rate of approximately 1 gallon per minute. Alternatively, this fresh water may be supplied from the heat exchanger although the cooler water is preferred.

Water from the water recycling tank is pumped through a distributing valve to the two sets of nozzles used in scrubbing the gas. In the preferred embodiment, approximately 40 gallons per minute is pumped to the nozzles used in association with the venturi cones and approximately 10 gallons per minute is pumped to the nozzles used in association with the ceramic bed.

The oil is removed from the top of the water recycling tank together with some of the water in the tank and is introduced into an oil separator tank. The water is removed from the top of the water recycling tank at the rate of approximately 1 gallon per minute. The oil separator tank may provide for final separation of the water and oil so that the water can be discharged to drain and the oil salvaged or discarded depending upon the condition thereof.

For the purpose of illustrating the invention, there is shown in the drawings a form which is presently preferred; it being understood, however, that this invention is not limited to the precise arrangements and instrumentalities shown.

FIG. 1 is a side elevation view of the apparatus of the present invention with the main conduit being broken away for purposes of illustration; and FIG. 2 is a section view taken along lines 2—2 of FIG. 1.

Referring now to the drawings in detail wherein like numerals indicate like elements throughout the two views, there is shown in FIGS. 1 and 2 an apparatus for removing oil from effluent gas generally indicated by reference numeral 10. Heated effluent gas normally emanates from a dryer or oven 12 into conduit 14.

The conduit 14 includes baffles 16 which are adapted to evenly disperse the gas in the conduit 14. The velocity of the gas in the conduit 14 is approximately 450 feet per minute. The size of the conduit 14 is normally dependent upon the volume of air emanating from the dryer 12.

The gas is normally heated between 200° F and 400° F. A heat exchanger 18 is provided for cooling the effluent gas. The heat exchanger 18 may be of conventional construction and include a plurality of finned tubes through which fresh water at approximately 50° F is adapted to flow. The gas is cooled to approximately 90° F to 125° F.

A pair of baffles 20 is mounted in the conduit 14 down stream from the heat exchanger 18. The baffles 20 direct the effluent gas into a series of vertically aligned venturi cones 22. The venturi cones 22 greatly increase the velocity of the gas causing substantial turbulence. A plurality of scrubbing nozzles 24 are provided adjacent the venturi cones 22. Scrubbing water emanates from the nozzles 24 into the gas stream as it flows through venturi cones 22. Approximately 60 percent of the oil is removed from the gas at this location. The condensible material removed at this location generally has a size in excess of one micron. The scrubbing water and oil entrained therewith is removed from the conduit 14 as will appear hereinafter.

The gas in the venturi cones has a velocity in excess of 1,000 feet per minute. As the gas flows beyond cones 22 and expands in conduit 14, the velocity decreases substantially.

The gas passes through a screen 26 and a ceramic bed 28. As the gas enters bed 28 it has a velocity of approximately 450 feet per minute. A plurality of scrubbing nozzles 30 are supported over the ceramic bed 28. The gas is forced to flow through a tortuous path through the ceramic bed 28 so that maximum contact is achieved with the scrubbing water emanating from the nozzles 30. The gas exits from the ceramic bed 28 through a screen 32. The gas travels at a velocity of approximately 450 feet per minute. Approximately 20 to 25 percent of the oil is removed from the gas at this location. The condensible material removed at this location generally as a size in excess of 1 micron.

A demister 34 is located down stream from the ceramic bed 28 and the conduit 14. The demister removes entrained droplets of water from the gas stream. Very little oil is removed from the gas by the demister. An electrostatic precipitator 36 is located down stream from the demister 34 and conduit 14. The electrostatic precipitator is of conventional design and serves to remove substantially all remaining oil from the gas stream. The condensible material removed in the electrostatic precipitator has a size of down to 0.005 microns.

The gas stream flows through an outlet 38 in conduit 14 to atmosphere. If desired, the outlet 38 can be provided with an air mover such as a conventional venturi or a blower to facilitate movement of the gas stream from the outlet 38 into atmosphere.

Water is introduced through the lines 40 into the heat exchanger 18. The water may be at approximately 50° F to 60° F. As the water exits from the heat exchanger, it is approximately 90° F to 125° F. A portion of the water may travel through line 42 into a water recycle tank 44 to make up for any water loss in the system. The remainder of the water may be transmitted to a storage tank (not shown). A fresh water line 46 may be used to introduce fresh water to the water recycle tank 44 at the rate of approximately 1 gallon per minute. The fresh water may be introduced below the water surface in the tank 44.

The water exiting from heat exchanger 18 may take an alternative path. The water may flow through line 48 into an energy balance device 52. A pump 50 is provided to pump the heated water into the energy balance device 52. The heat may be recovered from the water. A portion of the water may thereafter be pumped through line 54 into line 42 and thereafter into the tank 44. The remainder of the water may be pumped to a storage tank (not shown). The energy balance device 52 may recover heat from the water to either heat the plant or heat the gas introduced to the dryer or oven 12. If desired, only a portion of the water can be transmitted to device 52. Accordingly, some, all, or none of the water may be transmitted to device 52 depending upon whether heat in the water is to be recovered.

The water and oil is removed from the conduit 14 at spaced locations through lines 56, 58 and 60. Lines 56 and 58 may merge with line 60 and the oil and water mixture introduced to the top of water recycle tank 44 through line 60.

A pump 62 is provided for pumping water from the recycle tank through a line 64 into a distributing valve 66. The pump 62 is adapted to pump approximately 50 gallons of water per minute from the recycle tank 44. The distributing valve 66 directs approximately 40 gallons per minute through line 68 into scrubbing nozzles 24. The valve 66 distributes approximately 10 gallons per minute through line 70 into scrubbing nozzles 30.

The water within the recycle tank 44 is maintained at a temperature of approximately 90° F to 100° F with the temperature being even lower if an energy balance device 52 is utilized in the system. A vent 72 is provided for the water recycle tank 44. Water and oil are removed from the top of the water recycle tank 44 through a line 74. The water and oil are conveyed to an oil separator tank 76. The water is removed at the rate of approximately 1 gallon per minute. The oil separator tank 76 may be provided with means for further separating the oil and the water. The water may be discharged through a line 78 to drain. The oil may be recovered for further use or discarded to drain.

The size of the conduit 14 is dependent upon the volume of gas emanating from the dryer or oven 12. In the preferred embodiment, the velocity of the gas flowing through the conduit 14 is approximately 450 feet per minute with the speed being greatly increased as the gas passes through venturi cones 22. The turbulent gas exiting from the venturi cones is rapidly slowed to the desired velocity of 450 feet per minute as it expands in conduit 14 and passes through the screen 26 into ceramic bed 30.

The system provided requires little energy and maintenance. The system of the present invention is highly effective in use and returns substantially clean gas to the atmosphere.

When a dryer having a rated volume of approximately 8,000 cubic feet per minute of gas is utilized, the conduit 14 preferably has an inlet opening of approximately 3 feet by 6 feet. This will insure the desired velocity of the gas in the conduit 14. However, the height of the inlet opening can be increased or decreased depending upon the volume of air or gas introduced to the dryer 12. The system provided is effective with respect to condensible material in an effluent gas stream having a size of down to 0.005 microns.

The present invention may be embodied in other specific forms without departing from the spirit of essential attributes thereof and, accordingly, reference should be made to the appended claims, rather than to the foregoing specification as indicating the scope of the invention.

I claim:

1. Apparatus for removing oil from hot effluent gas comprising a conduit through which the effluent gas flows, heat exchanger means in said conduit for cooling the gas, baffle means for providing an even distribution of gas before the gas is introduced to said heat exchanger means, means supported by said conduit for increasing the velocity of said gas in the conduit, scrubber means cooperating with said velocity increasing means to effect a first scrubbing of said oil laden gas to remove oil from said gas, a ceramic bed within said conduit through which said gas is adapted to flow, second scrubbing means cooperating with said ceramic bed to effect a second scrubbing of said gas to remove oil from said gas, and electrostatic precipitation means within said conduit for removal of oil from the gas whereby the gas as it exits from said electrostatic precipitation means is substantially free of oil.

2. Apparatus as set forth in claim 1 wherein said velocity increasing means includes a plurality of vertically aligned venturi cones, baffle means adjacent said venturi cones to deflect the gas into the venturi cones.

3. Apparatus as set forth in claim 2 including a plurality of nozzles located adjacent said venturi cones, means for introducing a scrubbing liquid to said nozzles, said nozzles directing the flow of said scrubbing liquid into said venturi cones.

4. Apparatus as set forth in claim 1 including means for introducing water to said heat exchanger for cooling the gas, a recycle water tank, means for recycling the water for use in said first and second scrubbing means.

5. Apparatus as set forth in claim 4 including means for pumping the water which exits from the heat exchanger into a heat recovery means and means for transporting a portion of the water from the heat recovery means to said recycle tank.

6. Apparatus as set forth in claim 1 including demister means in said conduit for removal of water droplets from the gas, and said velocity increasing means comprising at least one venturi cone.

7. A method of removing oil from hot effluent gas comprising the steps of introducing the effluent gas into a conduit, transporting the gas over baffles to provide an even distribution of gas within the conduit, introducing the gas into a heat exchanger to cool the gas, scrubbing the gas to remove oil from the gas, increasing the velocity of the gas as the gas is scrubbed, introducing the gas to a filter, scrubbing the gas as it travels through the filter to remove oil from the gas, and introducing the gas to an electrostatic precipitator whereby the gas as it exits from the electrostatic precipitator is substantially free of oil.

8. A method as set forth in claim 7 including the steps of introducing water to the heat exchanger to absorb heat from the gas, transporting a portion of the water to a water recycle tank and utilizing the water in the water recycle tank for scrubbing the gas.

9. A method as set forth in claim 8 wherein the step of increasing the speed of the gas includes providing baffles which direct the gas into venturi cones and recovering the oil and the water in the conduit and transporting the recovered oil and water to the water recycle tank.

10. A method as set forth in claim 7 including the steps of introducing the gas into a demister to remove water from the gas and maintaining the velocity of the gas at approximately 450 feet per minute as it flows through the conduit at substantially all locations in the conduit except when the velocity of the gas is increased during initial scrubbing.

* * * * *